United States Patent [19]

Weinfield

[11] Patent Number: 4,938,440
[45] Date of Patent: Jul. 3, 1990

[54] ROTATABLE FLASHLIGHT HOLDER
[76] Inventor: Todd A. Weinfield, 1406 Burlingame Ave., Ste. 92, Burlingame, Calif. 94010
[21] Appl. No.: 286,810
[22] Filed: Dec. 20, 1988
[51] Int. Cl.⁵ .......................................... F16M 11/00
[52] U.S. Cl. ................................ 248/183; 248/178; 248/316.7; 248/206.5; 248/349
[58] Field of Search ............... 248/183, 316.7, 206.5, 248/278, 106, 179, 185, 313, 346, 349, 278, 371, 291

[56] References Cited

U.S. PATENT DOCUMENTS

| | | | |
|---|---|---|---|
| 1,222,458 | 4/1917 | Peterson | 248/316.7 |
| 1,268,622 | 6/1918 | Reynolds | 248/316.7 X |
| 2,220,220 | 11/1940 | Cusimano | 248/278 |
| 2,295,666 | 9/1942 | King | 248/346 |
| 2,305,233 | 12/1942 | Blaschke | 248/183 X |
| 2,978,215 | 4/1961 | Shanok et al. | 248/206.5 X |
| 3,014,679 | 12/1961 | Jepson | 248/278 |
| 3,144,232 | 8/1964 | Smootz | 248/313 X |
| 3,591,115 | 7/1971 | Hibbard | 248/122 |
| 3,845,928 | 11/1974 | Barrett et al. | 248/291 |
| 4,698,640 | 10/1987 | Redman | 248/349 X |
| 4,735,310 | 4/1988 | Lemery et al. | 248/680 X |
| 4,797,916 | 1/1989 | Kojima | 248/278 X |

FOREIGN PATENT DOCUMENTS 39431 10/1967 Japan .................................. 248/183
85/01648 4/1985 PCT Int'l Appl. ................. 248/371

Primary Examiner—Alvin C. Chin-Shue
Attorney, Agent, or Firm—T. R. Zegree

[57] ABSTRACT

A portable, rotatable holder for a flashlight enclosing a battery comprises a base structure, an upright housing secured thereto, a receptacle attached to the upper portion of the housing and a clamp mounted in the receptacle for receiving and releasably holding the body of the flashlight. The holder includes means for a dual rotational movement of the clamped flashlight to a desired position.

11 Claims, 1 Drawing Sheet

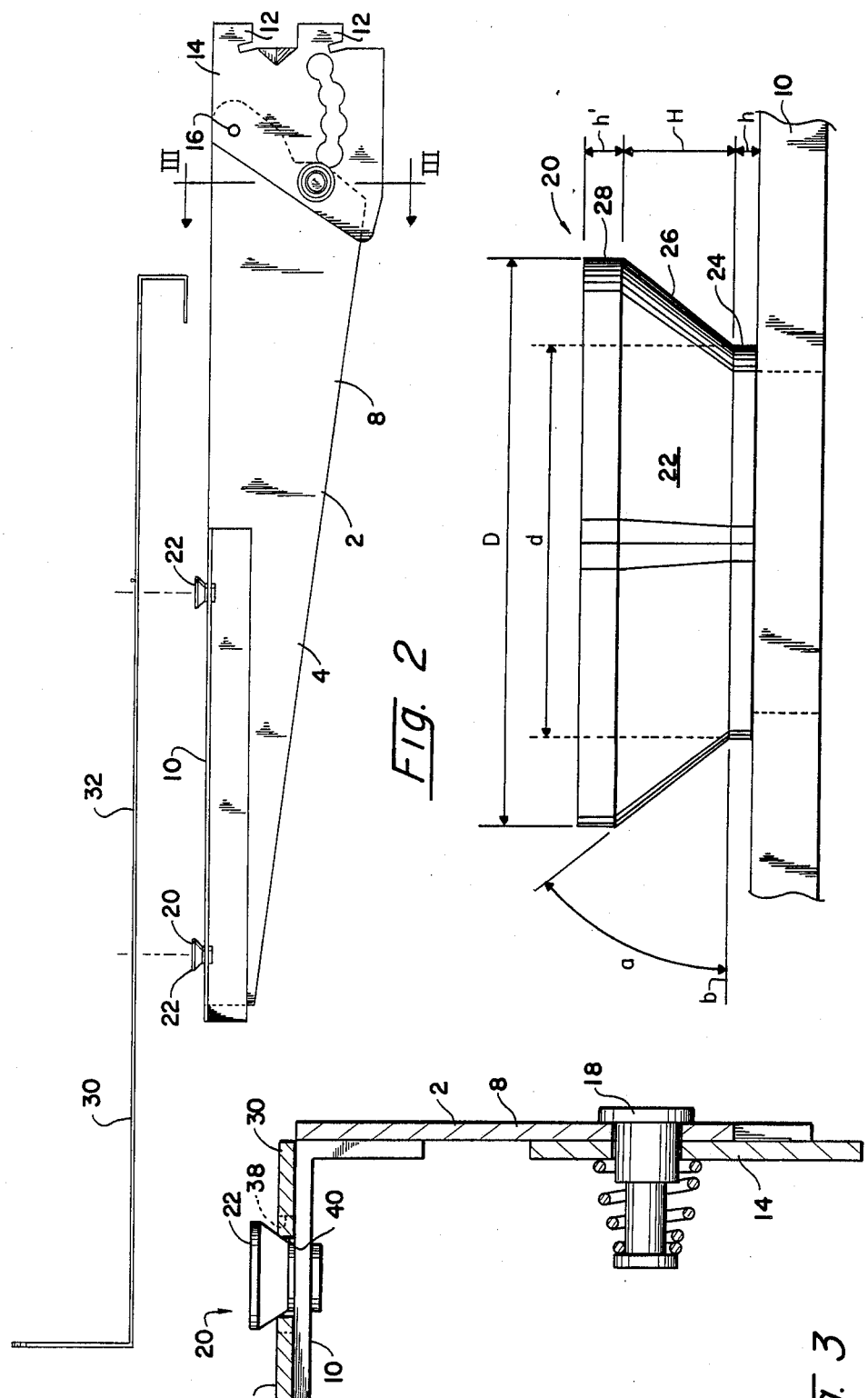

4,938,440

ROTATABLE FLASHLIGHT HOLDER

BACKGROUND OF THE INVENTION

The present invention relates to a rotatable holder for a flashlight. More particularly, the invention relates to a holding device for a standard flashlight, the device being adapted for adjustable movement thereof to a desired position.

Various types of flashlight holders have been described in the patent literature. For example, U.S. Pat. No. 1,684,347 to Dobbs describes a flashlight holder comprising a pair of clamping members connected together for pivotal movement and a clamp connected to the clamping members. U.S. Pat. No. 2,220,220 to Cusimano discloses a collapsible stand for holding a flashlight having two pivotably connected U-shaped bars. U.S. Pat. No. 2,886,664 to Graubner teaches a magnet switch U.S. Pat. No. 3,601,595 to Kivela describes a flashlight and lantern including an elastic strap adapted to be fastened to the user's body or garment and an adjustable mount for rotational movement of light beam. U.S. Pat. No. 3,713,614 to Taylor discloses a flashlight holder comprising a mounting bracket having an adhesive base and a magnet disposed within the bracket. U.S. Pat. No. 4,220,304 to Wong et al teaches an attachment for a flashlight to be magnetically attached to a metallic surface by means of a protruding magnet molded to the flashlight barrel.

While the above-mentioned prior art patents describe various concepts of holding devices for flashlights, the improved holder of the present invention encompasses a distinct approach in the structure of such devices as it is characterized by certain novel features and advantages not heretofore known in the art.

OBJECTS OF THE INVENTION

In view of the foregoing, it is the principal object of the invention to provide an improved rotatable holder especially adapted for use in conjunction with a conventional battery-holding flashlight.

Another object of the invention is to provide a small, portable holder for supporting a flashlight, such holder being characterized by a novel dual adjustable movement permitting a flashlight held therein to be placed in a desired position.

A further object of the invention is the provision of a flashlight held by the holder which is suitable for use in darkness to direct the light beam to any spot by simply rotating two separate adjustable means mounted in the holder to a selected position.

A still further object of the invention is to provide a convenient in use flashlight holder which can be made inexpensively from readily available materials.

These and other objects of this invention will become more fully apparent from the following description when considered in conjunction with the accompanying drawing.

BRIEF SUMMARY OF THE INVENTION

In accordance with the preferred embodiment of the invention, a rotatable flashlight holder comprises, in combination, a base structure, a U-shaped bracket extending upwardly from said base structure and rotatably secured thereto, first means for securing said U-shaped bracket to said base structure and adapted for rotatable movement of said bracket, a receptacle affixed to upper portion of said U-shaped bracket, second means for connecting said receptacle with said U-shaped bracket for rotatable polar movement of said receptacle and clamp means fastened in said receptacle for receiving and removably retaining a flashlight therein.

The holder may additionally include a magnet secured to the underside of its base structure for attachment of the holder to a magnetic surface.

DETAILED DESCRIPTION OF THE INVENTION

Figure 1:
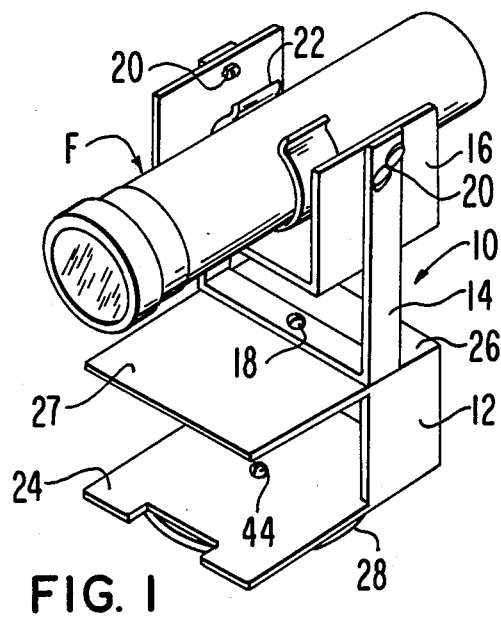
FIG. 1 a perspective view of the holder according to the invention showing placed in the clamp.
Figure 2:
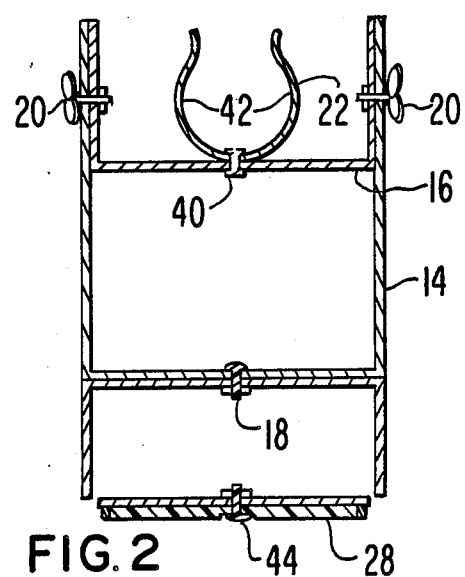
FIG. 2 crosssectional front elevation view of the holder alone without flashlight and with empty base structure.

Referring now to the drawing, wherein similar reference characters designate corresponding elements, a portable, rotatable flashlight holder 10 is illustrated in FIG. 1 with a flashlight F inserted therein in operative position and in FIG. 2 in which the holder is shown without flashlight. Holder 10 is composed of four main structural elements, i. e. a base structure 12, an upright U-shaped bracket 14 rotatably secured thereto, a receptacle 16 rotatably affixed to upper portion of bracket 14 and a clamp means 22 fastened in receptacle 16 and adapted for removably holding a flashlight therein.

The U-shaped bracket 14 is secured to the horizontal top wall 27 of base structure 12 by first fastener means 18, preferably in the form of a nut and threaded bolt, which is mounted vertically through an aperture in the center of the bottom wall of the U and another central aperture in the top wall of the base structure 12 registering therewith. First means 18 is adapted for rotational movement of U-shaped bracket 14 about vertical axis either clockwise or counterclockwise about the entire 360° circle by slightly loosening fastener means 18, then tightening it at a selected position of bracket 14. Second means 20 provided for connection of bracket 14 with receptacle 16 extends through axially registering apertures in the upper portions of each side wall of bracket 14 and in the vertical legs of receptacle 16. Thus each pair of adjacent apertures forms a passageway for fastening means 20 for adjustable attachment of receptacle 16 to U-shaped bracket 14. Although any standard fastening means is suitable, a combination of a threaded bolt and wingnut on one side and a threaded bolt and nut on the opposite side of receptacle 16 are preferred. A threaded bolt and wingnut on each side are likewise satisfactory. It will be noted that fastening means 20 permits a rotatable polar movement of receptacle 16 at right angles from vertical axis in each direction by loosening somewhat second means 20 and thereafter tightening it when a desired position for bracket 14 is attained.

It will be understood that the dual arrangement of the function of first means 18 and of second means 20 provides rotational movements of bracket 14 and receptacle 16, respectively, in mutually perpendicular planes, thereby permitting an inclination of the flashlight clamped in the holder in any desired angular position, which represents an important feature of this invention.

Figure 3:
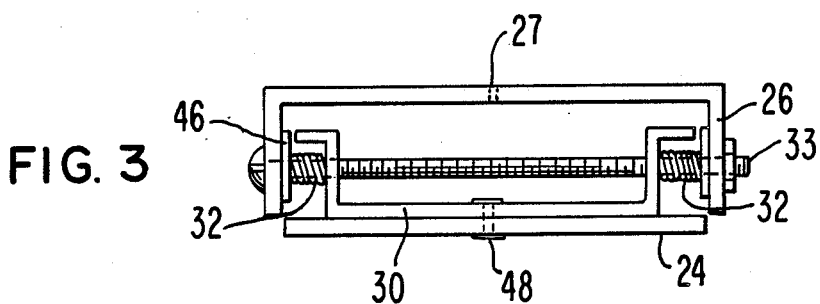
FIG. 3 is a somewhat enlarged rear view of the base structure.

As illustrated in FIG. 3, the base structure 12 is composed of a horizontal bottom plate member 24 and an inverted U-shaped upper member 26 having a horizontally extending top wall 27 spaced apart from the bottom plate member 24 in a parallel relation thereto and a pair of vertical side walls joining top wall 27 and bottom plate member 24, the sizes of bottom plate member 24 and of spaced apart top wall 27 being substantially the same. A pair of holding brackets 46 is provided adjacent each side of vertical inner walls of the U in the U-shaped upper member 26, and attached to both such walls by suitable fasteners, such as threaded bolts and nuts to insure adequate support for upper member 26.

Base structure 12 further includes an upright U-shaped spring bracket 30 secured to the rear end of bottom plate member 24 by a suitable fastener 48, such as a rivet, extending through vertically aligned holes in bracket 30 and plate 24, a threaded shaft 33 positioned horizontally through registering holes in vertical portions of the U in member 26, in holding brackets 46 and in vertical walls of spring bracket 30. Shaft 33 comprises a head at one end and threaded a nut at the opposite end thereof. A pair of torsion springs 32 are mounted on threaded shaft 33 between each bracket 46 and each vertical wall of spring bracket 30 to insure a proper tension of the structure when upper member 26 is swung to a desired angular position so that a firm grip of the object to be clamped is achieved, as will be explained hereinbelow.

Figure 4:
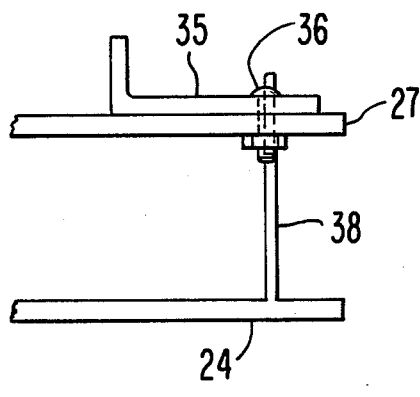
FIG. 4 enlarged partial side view of the end portion of the extended top wall of the inverted U-shaped upper member.
Figure 5:
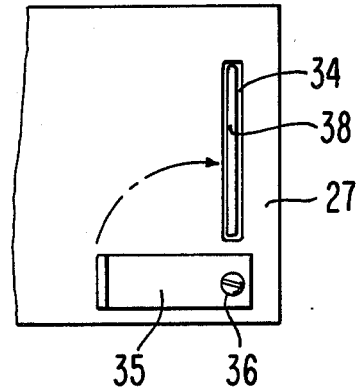
FIG. 5 is an enlarged partial top view of the end portion of the extended top wall structure with the stop member turned away 90° from the slot.

In another form of the invention, an additional clamping arrangement is provided, as illustrated in FIGS. 4 and 5, wherein upright plate 38 projects upwardly from the end portion of bottom plate member 24 and is adapted to pass through longitudinal slot 34 located near the end portion of top wall 27, the length of slot 34 being slightly greater than that of the upper edge of plate 38. An L-shaped stopper member 35 is affixed rotatably by a suitable fastener 36, such as a threaded bolt and nut, to the end portion of top wall 27 adjacent slot 34 to prevent insertion of upper portion of plate 38 so that it will not protrude through slot 34 when it is not desired. Stop member 35 is adapted for rotation from its inactive position to its intended position covering slot 34, as indicated by the arrow in FIG. 5, by simply loosening fastener 36 and placing stop member 35 over slot 34.

The clamp means 22 secured to the bottom of receptacle 16 by a suitable fastener 40, such as a rivet, comprises a pair of spaced apart, opposed, deformable, coacting spring-like clips 42 having a substantially arcuate shape adapted for releasable firm gripping engagement with the cylindrical body of a conventional flashlight F in its initial transverse relation to the vertical axis of holder 10. Each clip 42 comprises a free upper end extending outwardly, as shown in FIG. 2, to facilitate insertion of the flashlight. The body of flashlight F is easily inserted into clamp means 22 by pressing it downwardly into the space between the two coacting clips 42 until it is firmly engaged and held therebetween. If desired, a second pair of clips 42 may be secured in receptacle 16 in a mutually parallel relationship with the first pair to increase firmness and stability of holding action of clamp means 22.

While the holder of this invention with a flashlight inserted therein may be used in many instances by simply placing it in vertical position on any flat surface, a magnet 28 may optionally be secured to underside surface of bottom plate member 24 by a fastening means 44, such as a threaded bolt and nut, extending through a hole in the usual magnet holder and a registering hole in bottom plate 24. A flashlight holder of this invention provided with a magnet may be used by attaching its bottom to a supporting magnetic surface, thereby permitting the user to have both hands available for the intended purpose.

The additional clamping arrangement described hereinabove is useful in mounting the holder with a flashlight gripped therein on a handle bar of a bicycle ridden in darkness, thereby enhancing safety for the rider.

The holder according to the invention can be fabricated from a rigid metal, such as aluminum or stainless steel, by constructing the essential parts thereof and assembling them by suitable fasteners, as described hereinabove.

It will be apparent from the foregoing description of the invention in its preferred embodiment that I have devised an improved rotatable flashlight-supporting holder adjustable angularly to any position through its unique rotational mobility in two perpendicularly oriented planes. The device is characterized by a combination of new features which are required for its basic function, i. e. its ability of projecting light beam from a flashlight to any dark spot regardless of its location. The novel structure of my holder permits a battery-operated flashlight to be maintained in a fixed and stable position, thereby providing a convenient manner of lighting a dark area while obviating the necessity of holding or carrying a flashlight by hand. The holder described herein is useful in situations where electric power is either disrupted or unavailable, in overnight outdoor camping, in repair work underneath motor vehicles behind bumper or under fender and in any dark locations having no electrical outlets.

It will be understood that various modifications in the form of this invention as herein described may be made without departing from the spirit or the scope of the claims which follow.

I claim:

1. A rotatable flashlight holder adapted for dual rotational movement comprising, in combination:
   a base structure which comprises a bottom plate member (and), an inverted U-shaped upper member having a horizontally extending top wall spaced apart from said bottom plate member in a parallel relation thereto and an upright U-shaped spring bracket secured to said bottom plate member inside said base structure;
   a U-shaped bracket extending upwardly from said base structure and rotatably secured thereto:
   first means for securing said U-shaped bracket to said base structure and adapted for rotatable movement of said U-shaped bracket in horizontal plane;
   a receptacle affixed to upper portion of said U-shaped bracket;
   second means for connecting said receptacle with said U-shaped bracket for rotatable polar movement of said receptacle in vertical plane; and
   clamp means fastened in said receptacle for receiving and removably retaining a flashlight therein.

2. A holder of claim 1 wherein said base structure includes a magnet secured to underside surface of said bottom plate member.

3. A holder of claim 1 wherein said base structure includes a threaded shaft extending through vertical portions of said inverted U-shaped bracket and a pair of torsion springs mounted on said threaded shaft.

4. A holder of claim 1 wherein said (U-shaped upper member comprises a) horizontally extending top (flange, said flange having) wall includes a slot for insertion therethrough of upright plate projecting from end portion of said bottom plate member.

5. A holder of claim 4 wherein a rotatable L-shaped stop member is secured to said top wall to prevent insertion of said upright plate through said slot.

6. A holder of claim 1 wherein said U-shaped bracket includes an aperture in upper portion of each side wall thereof disposed to be axially aligned with an aperture in each side wall of said receptacle, each pair of adjacent apertures forming a passageway for fastening means for adjustable attachment of said receptacle to said U-shaped bracket.

7. A holder of claim 6 wherein said fastening means comprises a wingnut and a bolt.

8. A holder of claim 1 wherein said U-shaped bracket includes a central aperture in bottom wall thereof registering with a central aperture in top wall of said base structure.

9. A holder of claim 8 wherein a fastener means is mounted through said central apertures for securing said U-shaped bracket to said top wall of said U-shaped upper member.

10. A holder of claim 1 wherein said clamp means comprises a pair of spaced apart opposed spring clips having a substantially arcuate shape adapted for releasable gripping of the flashlight.

11. A holder of claim 1 wherein the flashlight is gripped firmly by said clamp means in substantially transverse relation to vertical position of said holder.

* * * * *

UNITED STATES PATENT AND TRADEMARK OFFICE
CERTIFICATE OF CORRECTION

PATENT NO. : 4,938,440

DATED : July 3, 1990

INVENTOR(S) : Weinfield

It is certified that error appears in the above-identified patent and that said Letters Patent is hereby corrected as shown below:

Column 1, line 19, the phrase -- combination to enable the flashlight to be supported on a metal surface. -- should be inserted after "switch";

Column 2, line 10, after "1" insert -- is --;

line 11, after "showing" insert -- a flashlight --;

line 12, after "2" insert -- is a --;

line 17, after "4" insert -- is an --;

Column 3, line 27, "threaded a" should read -- a threaded --.

Signed and Sealed this

Fourteenth Day of May, 1991

*Attest:*

HARRY F. MANBECK, JR.

*Attesting Officer*      *Commissioner of Patents and Trademarks*